Dec. 21, 1954 J. A. BOYAJEAN, JR Re. 23,914

MACHINE FOR PRODUCING SCREENED RELIEF PATTERN PLATES

Original Filed July 24, 1948 4 Sheets-Sheet 1

INVENTOR.
JOHN A. BOYAJEAN, Jr.
BY Lawrence B. Dodds
ATTORNEY

INVENTOR.
JOHN A. BOYAJEAN, Jr.
BY Laurence B Dodds
ATTORNEY

INVENTOR
JOHN A. BOYAJEAN, Jr.
BY Lawrence B. Dodds
ATTORNEY

INVENTOR.
JOHN A. BOYAJEAN, Jr.
BY Lawrence B. Dodds
ATTORNEY

United States Patent Office

Re. 23,914
Reissued Dec. 21, 1954

23,914

MACHINE FOR PRODUCING SCREENED RELIEF PATTERN PLATES

John A. Boyajean, Jr., Huntington, N. Y., assignor to Fairchild Camera and Instrument Corporation, a corporation of Delaware Original No. 2,575,546, dated November 20, 1951, Serial No. 49,594, July 24, 1948. Application for reissue November 18, 1953, Serial No. 393,027

27 Claims. (Cl. 178—6.6)

Figures 1, 1A:
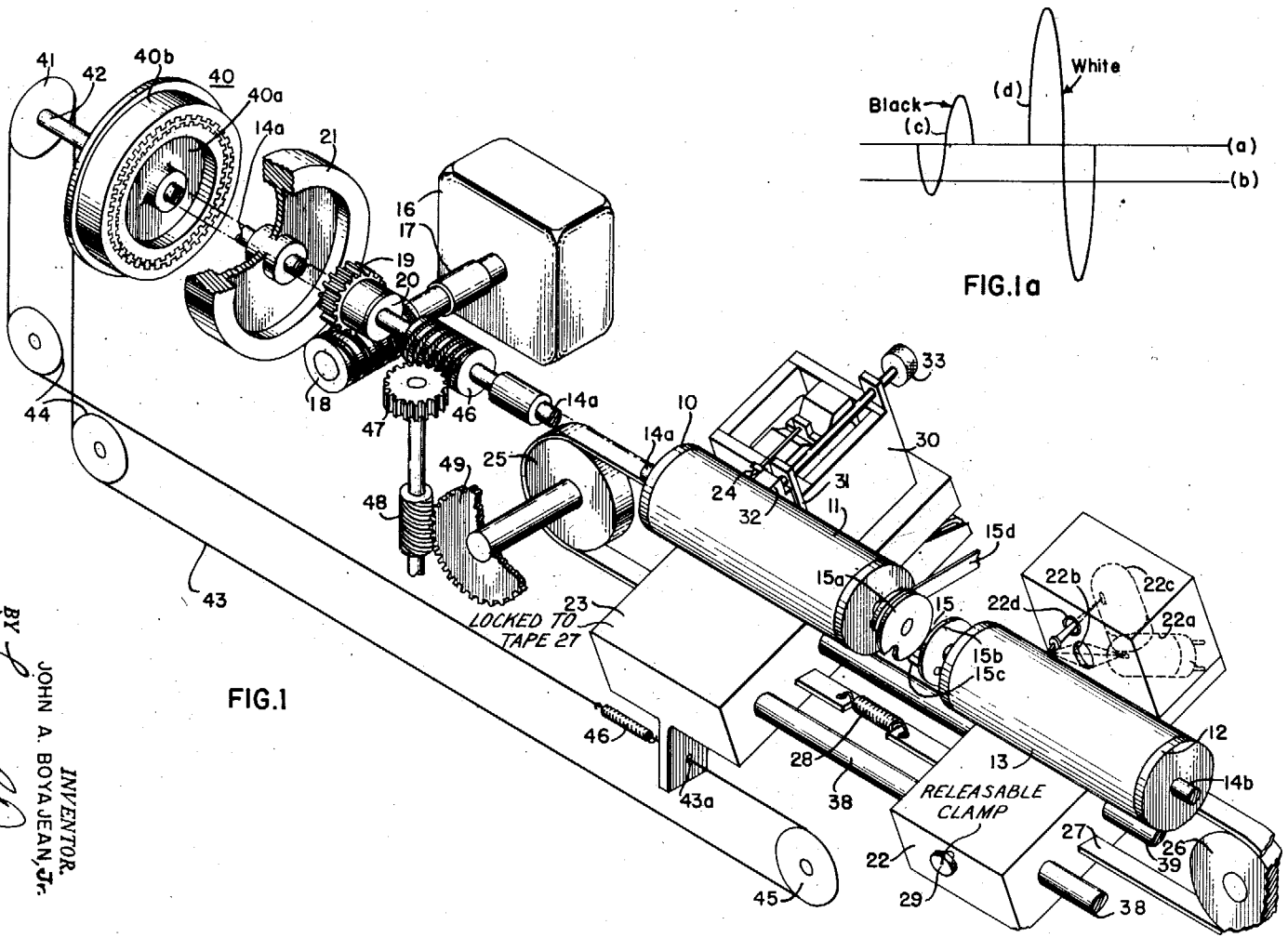

Matter enclosed in heavy brackets [ ] appears in the original patent but forms no part of this reissue specification; matter printed in italics indicates the additions made by reissue.

This invention relates to machines for producing screened relief pattern plates and, while it is of general application, it is particularly adapted for producing on a decomposable plate a half-tone reproduction of any reproducible image sheet, which plate is suitable for further reproduction of the image by printing or like duplicating processes.

In the reproduction of images, such as photographic prints or negatives by printing or like duplicating processes, it has been customary to produce half-tone engravings, that is, engraving plates having a "screen" structure composed of a series of regularly spaced dots, by photochemical processes. In such half-tone plates, the average size and spacing of the dots in each incremental portion of the plate vary proportionately with the average shade value or greyness of the corresponding portion of the image. The surfaces of these dots lie in the original plane of the plate and receive the printing ink from a roller or the like.

Such half-tone plates and their method of manufacture are well known in the art, so that no detailed description is required here. However, it is also well known that the process of making such photo-engravings involves elaborate and expensive equipment and a large number of steps, each of which must be performed with great care and skill in order to obtain a satisfactory half-tone plate. Such skill is generally acquired only by extended apprenticeship and artisans of the required skill are frequently unavailable. All of the foregoing factors contribute to the high cost of such half-tone plates and to the time required for their completion.

Heretofore there have been proposed various machines and apparatus for automatically and mechanically forming half-tone plates representative of an image to be reproduced. Such machines have generally included a support for an image sheet, a support for the plate to be formed, and mechanism for scanning the two supports synchronously. The image sheet scanner has included a photoelectric pick-up, the output of which is amplified electrically and utilized to actuate some type of plate-cutting or deforming tool carried by the plate scanner. An interrupter is included at some point in the system to produce the screen structure. In one previously proposed arrangement, the plate-deforming tool is in the form of a heated stylus acting on a plate of decomposable material but, in general, such proposed machines have utilized metal plates and the deforming tool has been a high speed rotating cutter or chipping or gouging tool. With this type of apparatus, the tool generally leaves small burrs or other irregularities over the face of the plate which seriously interferes with obtaining satisfactory reproductions. Furthermore, the metal plates used in such machines are generally heavy, costly, and difficult to ship and are easily damaged by improper handling.

Furthermore, the automatic machines for forming such half-tone plates heretofore proposed have been complex and cumbersome in operation and have been difficult to maintain in accurate adjustment, which is necessary to procure half-tone plates of reasonable cost and satisfactory quality.

It is an object of the present invention, therefore, to provide a new and improved machine for producing screened relief pattern plates which obviates one or more of the above-mentioned disadvantages of the prior-art machines of the type described.

It is another object of the invention to provide a new and improved machine for producing screened relief pattern plates which achieves one or more of the following advantageous characteristics not hitherto realized: virtual elimination of skill or technique in operation of the machine; substantial reduction in time required to form a plate; ability to form a number of plates simultaneously; extreme accuracy of reproduction of all image shades; elimination of all chemical and photo-chemical processes; predetermination of the desired contrast range, that is, range from full white to full black; and a substantial reduction in the weight of the formed plates.

In accordance with one feature of the invention, there is provided a machine for producing on a plate from an image sheet a screened relief pattern suitable for image reproduction by printing processes comprising a first cylinder for supporting a plate, a second cylinder for supporting an image sheet, and means for rotating the cylinders synchronously. The machine further comprises a first reciprocable carriage including an electro-optical pick-up system disposed for scanning an image sheet on the second cylinder, a second reciprocable carriage including a plate-deforming tool disposed for scanning a plate on the first cylinder, means responsive to the output of the pick-up system for actuating the plate-deforming tool, and means for reciprocating the carriages synchronously. The machine also includes an electrical screen generator including a rotor element driven synchronously with said cylinders and an independently rotatable stator, and means for rotating said stator at a speed of a lower order of magnitude than said rotor element, the output of said generator being connected to modulate the output of said pick-up system.

In the preferred embodiment of the invention, the engraving machine optionally includes other desirable features, among which are the following: the electro-optical pick-up system includes a light source and a source of pulsating current of screen frequency, such as the screen generator, connected for modulating such light source; in order to form on the plate an inverted image of that on the image sheet, the pick-up system carriage and the tool carriage are driven by a tensioned inelastic belt, one of the carriages being adapted to be locked to one run of the belt and the other being provided with a releasable clamp to engage the other run of the belt; further, the tool carriage comprises a tool-actuating assembly carrying the plate-deforming tool and means for biasing the tool assembly into engagement with the plate cylinder; the tool assembly also includes an adjustable shoe engaging a plate on the plate cylinder for determining the neutral position of the tool.

In accordance with another feature of a preferred form of the invention, a machine of the type described includes means for adjusting the output of the screen generator to adjust the minimum deformation of the plate, corresponding to the black level of an image sheet, and means for adjusting the output of the pick-up system substantially independently to adjust the maximum deformation of the plate, corresponding to the white level of an image sheet.

Another feature of the preferred form of the invention comprises means for biasing the plate-deforming tool to an inoperative position, a normally excited electromagnetic means for retaining the tool in an operative position, and means responsive to the failure of the source of periodic screen potential, such as the screen generator, for actuating the tool to an inoperative position.

For a better understanding of the present invention, together with other and further objects thereof, reference is had to the following description taken in connection with the accompanying drawings, and its scope will be pointed out in the appended claims.

Figure 3A:
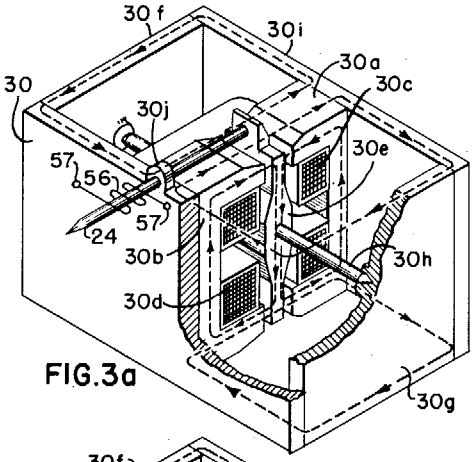
Figure 3B:
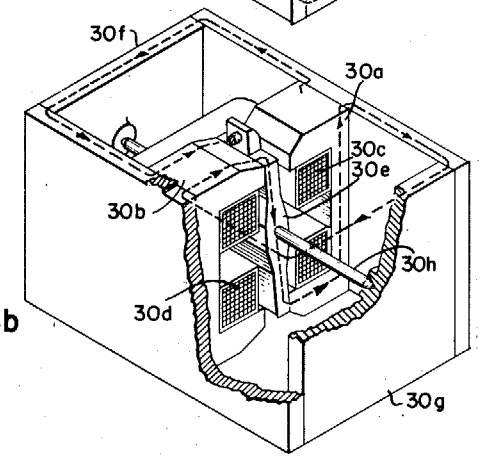
Figure 2:
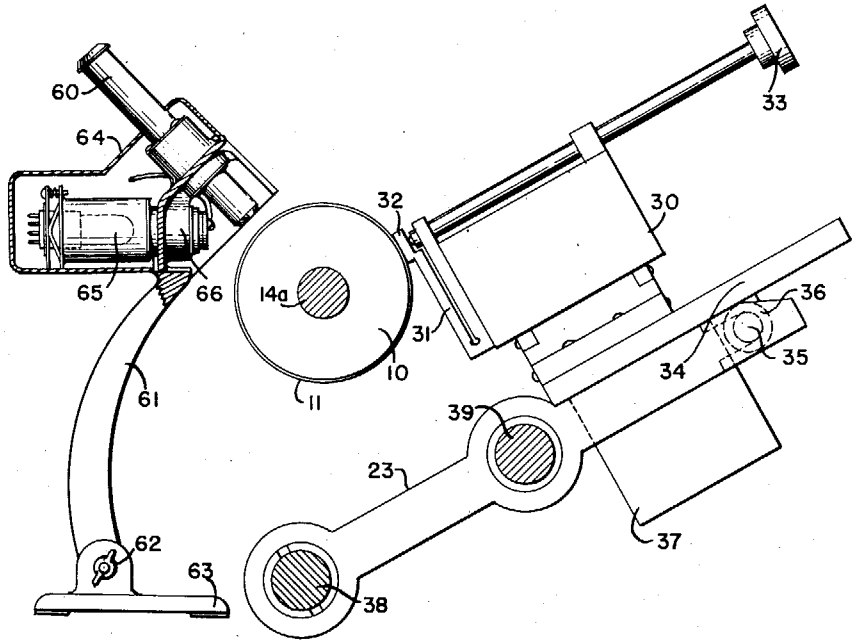
Figure 4A:
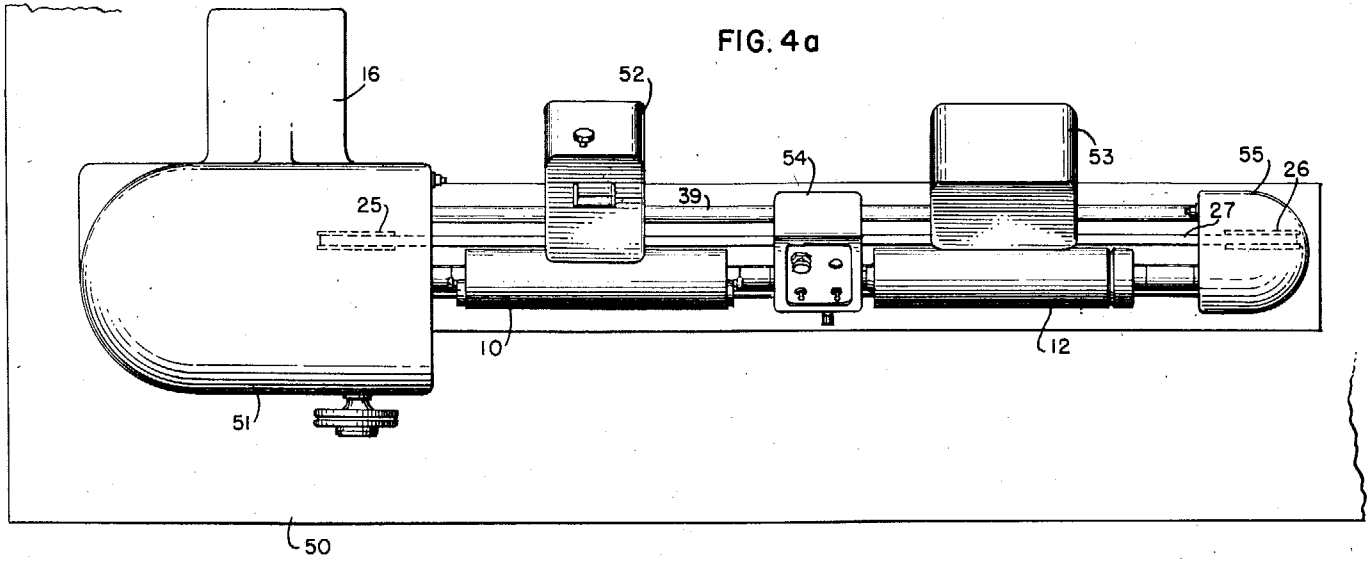
Figure 4B:
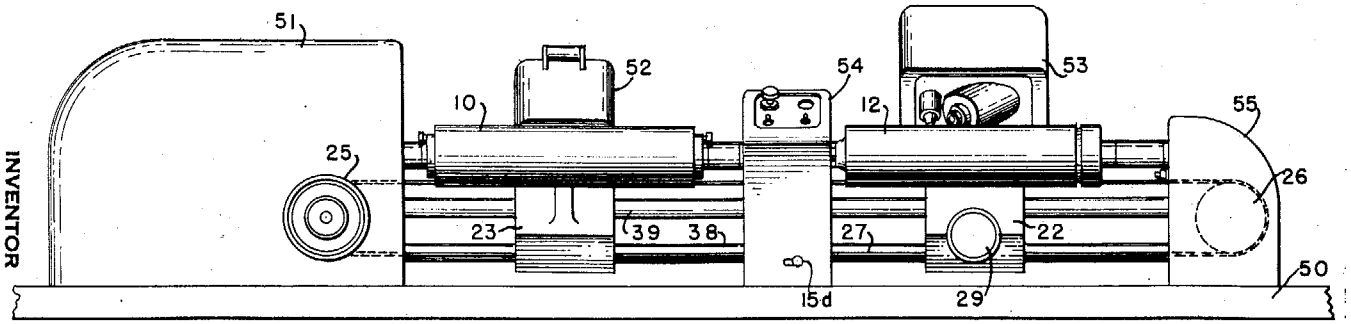
Figure 5:
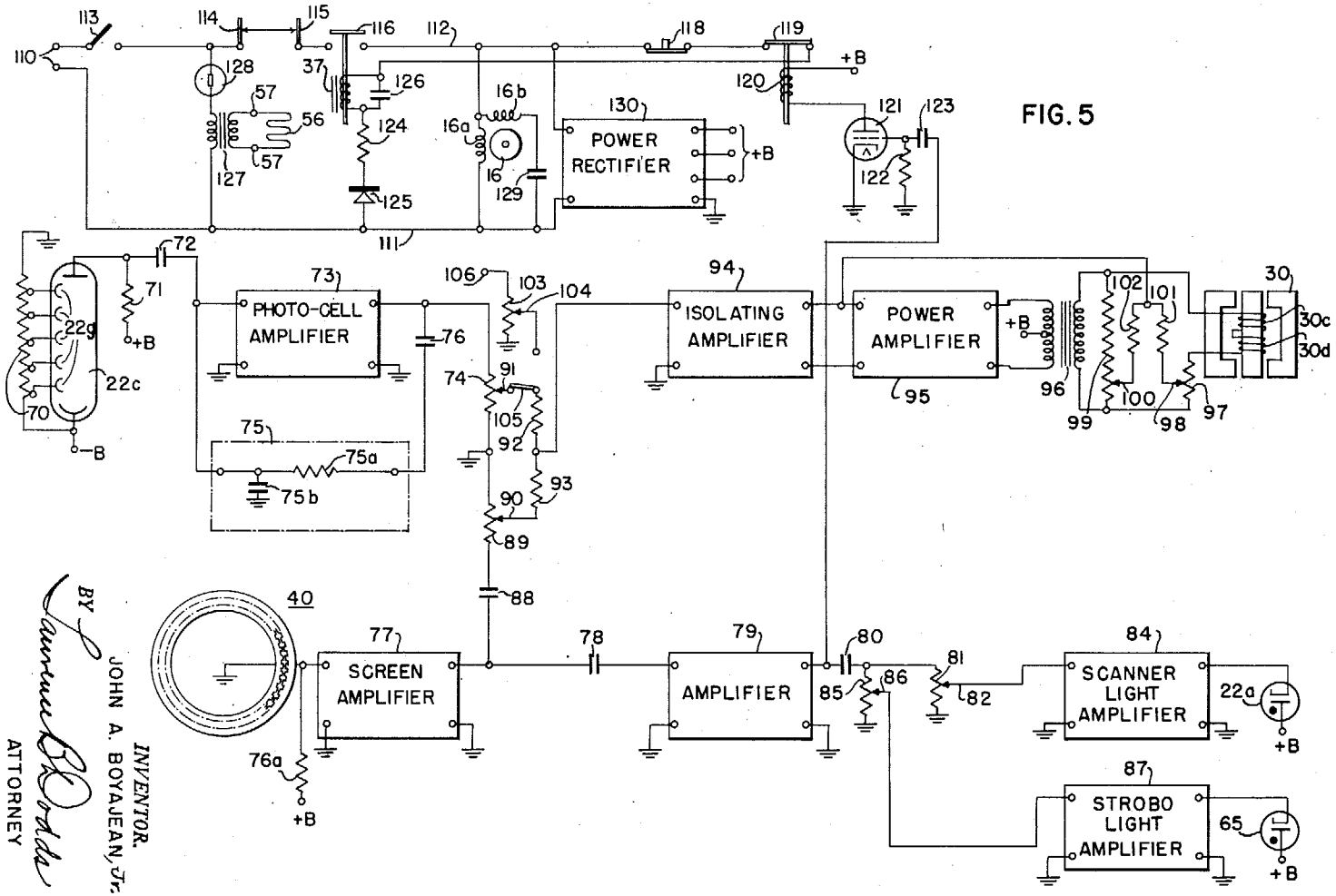

Referring now to the drawings, Fig. 1 is a schematic perspective of a machine for producing on a plate from an image sheet a screened relief pattern suitable for image reproduction by printing processes; Fig. 1 is a chart to aid in explanation of the operation of the machine of Fig. 1;

Fig. 2 is a fragmentary view, partly in section, of the plate-deforming tool assembly of the machine of Fig. 1 together with an associated stroboscopic viewer; Figs. 3a and 3b are schematic perspective views of the tool-actuating mechanism in its neutral position and one extreme position, respectively; Figs. 4a and 4b are top plan and longitudinal elevational views, respectively, of the machine represented in Fig. 1; while Fig. 5 is a schematic electrical circuit diagram of the various electrical and electronic components of the machine of Fig. 1.

Referring now more particularly to Fig. 1 of the drawings, there is illustrated schematically a machine embodying the invention for producing on a plate from an image sheet a screened relief pattern suitable for image reproduction by printing processes. By the term "image sheet," as used herein and in the appended claims, is meant any sheet carrying an optical representation of the image to be reproduced, such as a photographic positive or negative print, a photographic transparency, either positive or negative, or the like. By the term "screened relief pattern," as used herein and in the appended claims, is meant a pattern in which regularly spaced portions of the surface are removed, the area of the removed portions in any elemental portion of the print varying with the shade values of the corresponding elemental portion of the image to be reproduced, the best known example of such a screened relief pattern being the half-tone photo-engraved plate. By the term "printing processes," as used herein and in the appended claims, is meant any process by which a plate carrying a screened relief pattern may be utilized to produce multiple reproduced images, of which the most usual example is the conventional printing process.

The machine of Fig. 1 includes plate and image sheet supports, specifically, a cylinder 10 on which is supported or secured in any suitable manner a plate 11 of deformable material and a second cylinder 12 on which is supported or secured an image sheet 13. By the term "deformable material" is meant a material that may be cut, gouged, decomposed or otherwise deformed by an engraving tool or stylus to form an image-reproducing plate. The plate and cylinder assembly 10, 11 may be of any suitable type, but preferably is of the type described and claimed in applicant's copending application, Serial No. 40,595, filed concurrently herewith. The image sheet 13 for use in the machine specifically described hereinafter is a photographic positive print.

The machine of Fig. 1 includes means for rotating the cylinders 10 and 12 synchronously and preferably isochronously. Specifically, this rotating means includes a common shaft for the two cylinders including portions 14a, 14b coupled by a disengageable coupling 15. The coupling 15 includes a notched disc 15a and a complementary disc 15b provided with a pin 15c adapted accurately to engage the notch of disc 15a when these discs are moved axially by a lever 15d to effect engagement of the coupling. This pin-type coupling ensures engagement of the two shaft portions 14a, 14b in a predetermined phase relationship so that they rotate isochronously. The shaft 14a is connected to be driven by a motor 16 which may be of any suitable type, although if a number of machines are to be operated in multiple, as described hereinafter, the motor must be of the synchronous type. The driving connection from the motor 16 to the shaft 14a includes a flexible coupling 17 of any suitable type which mechanically filters or smoothes out any pulsation characteristic of the driving motor 16. This driving connection further includes a worm 18 and engaging worm gear 19 and an over-running or one-way drive clutch 20, the driving element of which is connected to gear 19 and the driven element of which is connected to shaft 14a. On the drive shaft 14a is a heavy fly wheel 21 which ensures pulsationless rotation of the shaft 14a, 14b and the cylinders 10 and 12 regardless of irregularities which might otherwise result from the characteristics of the motor 16 or imperfections in the driving gears. The over-running clutch 20, which may be of any conventional type, serves two purposes: (1) it allows the fly wheel 21 to decelerate normally upon de-energization of the driving motor 16 without imposing an undue back load on the speed-reducing gears 18, 19 and (2) it permits manual rotation of the cylinders 10 and 12 during mounting of the respective plate 11 and image sheet 13 thereon, free of the driving gearing.

The machine of Fig. 1 also includes means, such as a reciprocable carriage 22 including an electro-optical system, for scanning an image sheet 13 on its supporting cylinder 12. The electro-optical scanning system is shown schematically as including a light source 22a having an optical system 22b and a photocell 22c provided with an optical system 22d including an aperture stop to limit its field of view to an elemental area of the image sheet 13 and is disposed to receive only diffused reflection, that is, the angle of incidence of the axis of optical system **22*b* at the image sheet 13 is not the same as the angle of reflection of the axis of the optical system 22d. The machine further includes means, such as a reciprocable carriage 23 including a plate-deforming tool 24, for scanning a plate 11 on its supporting cylinder 10. By the term "plate-deforming tool," as used herein and in the appended claims, is meant a tool capable of deforming a plate 11 as by cutting, gouging, indenting, thermally decomposing, or the like. In the preferred embodiment of the invention, the tool 24 is a heated stylus for thermally decomposing incremental areas of the surface of the plate 11, as described hereinafter. The carriages 22 and 23 reciprocate on parallel longitudinal guide rods 38 and 39**.

There is further provided a mechanism for reciprocating the carriages 22 and 23 in opposite directions to form a laterally inverted screen relief pattern on plate 11. This mechanism includes a pair of spaced pulleys 25 and 26 and a tensioned inelastic belt, such as a steel tape 27, supported on the pulleys. Tensioning of the tape 27 is effected by a stiff helical spring 28 joining its two ends. The pulley 25 is driven from shaft 14a through double worm gearing 46, 47 and 48, 49, the gear ratio being preferably so chosen that the pulley 25 makes one revolution for the complete normal range of travel of the carriages 22 and 23. One of the carriages, preferably the carriage 23, is adapted to be locked or secured (by means not shown) to the lower run of the tape 27, while the other carriage 22 is provided with a releasable clamp disposed to engage the upper run of the tape 27 and including a manually operable element or knob 29, by which the carriage 22 can be released from the tape 27 to permit adjustment of the carriage 22 independent of the carriage 23 upon disengagement of the pin coupling 15. This adjustment is provided to permit accurate registration of the electro-optical system of the carriage 22 with an image sheet 13 on the cylinder 12 when initially setting up the machine.

The carriage 23 includes a tool-actuating assembly 30 for driving the plate-deforming tool 24. As shown in Fig. 2, the assembly 30 includes means for determining its neutral position with respect to the plate 11 on the cylinder 10. This means is in the form of a resilient hairpin 31 having one arm secured to the assembly 30 and carrying at the end of the other arm a shoe 32 disposed to engage a plate 11 on the cylinder 10. The separation of the arms of the hairpin 31 may be adjusted to adjust the neutral position of the shoe 32 by means of a thumb nut 33 threaded in the other arm of the hairpin 31.

The tool-actuating assembly 30 also includes means for biasing the tool to an inoperative position. To this end, the assembly 30 is mounted on a platform 34 which is pivoted on the carriage 23 as by a pivot pin 35. About the pivot pin 35 is secured a stiff helical biasing spring 36 with extending portions acting on the platform 34 and carriage 23 to bias the carriage 30 for pivotal movement in a clockwise direction about the pivot pin 35. Secured to the under side of the carriage 23 is an electromagnet 37, for which the pivoted platform 34 acts as an armature. As described hereinafter in connection with the circuit diagram of Fig. 5, the electromagnet 37 is normally excited to attract the platform 34 and retain the shoe 32 and the tool 24 in an operative relation with respect to the cylinder 10 and plate 11. The tool-actuating assembly 30 also includes electromagnetic means connected to respond to the output of the electro-optical pick-up system 22a—22d for actuating the tool 24. This electromagnetic actuating means is shown more clearly in Figs. 3a and 3b, while its connection to the electro-optical pick-up system is described hereinafter with reference to the complete circuit diagram of Fig. 5.

The machine of Fig. 1 further includes a source of periodic pulsating potential or current, specifically, an electrical screen generator 40 driven synchronously with the cylinders 10 and 12 and connected to modulate the output of the pick-up system 22a—22d for producing a pulsating excitation of the actuating means 30 at a screen frequency. Specifically, the generator 40 includes a toothed rotor element 40a, mounted on and driven by the shaft 14a, thus eliminating any back-lash in the drive of the screen generator and ensuring absolute accuracy in the spacing of the screen dots. The generator also includes an independently rotatable toothed stator element 40b. The teeth of the elements 40a and 40b are equally spaced about the outer and inner peripheries thereof, respectively, the number of teeth in each being determined by the desired "screen." For example, if a 120-screen plate is desired, each of the elements 40a and 40b will have $120/\sqrt{2}$ teeth within an angle of rotation corresponding to a peripheral travel of the stylus 24 of one inch on the plate 11. The elements 40a and 40b are electrically insulated from each other and are connected in an electrical circuit to form the two elements of a condenser, as described hereinafter in connection with the complete electrical system of the machine.

There is also provided means for rotating the stator element 40b at a speed of a lower order of magnitude than the rotor element. Specifically, there is provided a speed-reducing means between the shaft 14a and stator element 40b. This means includes a pulley 41 mounted on a shaft 42 supporting the stator element 40b. Driving the pulley 41 is an endless belt 43 passing around a pair of guide pulleys 44 and a return pulley 45 disposed so that the upper run of the belt 43 is parallel with the path of movement of the carriage 23. The belt 43 is connected to be driven by the carriage 23 as by a connection 43a, as shown, and includes a tensioning spring 46 on the return side of its connection 43a. Adjustment of the speed ratio may be determined by selection of the diameter of pulley 41 relative to the lead of the carriage 23. The overall reduction is such that the speed of the stator element 40b is a small fraction of the speed of the cylinders 10 and 12. If a plate is desired in which the angle of the screen lines is 45°, as is customary, the speed of the stator element 40b is that fraction of the speed of the cylinders 10 and 12 such that the stator 40b rotates an angular distance equal to one tooth and space during the time that the cylinders 10 and 12 make two complete revolutions.

The details of construction of the stylus actuating mechanism 30 are best shown in the schematic perspective views, partly in section, of Figs. 3a and 3b. As shown, the magnetic circuit of the mechanism 30 is formed by two spaced opposed C-magnets 30a and 30b. Symmetrically disposed in the air gaps formed between the opposed legs of the C-magnets 30a and 30b is a vane-like magnetic armature 30e about either end of which are disposed the actuating windings 30c and 30d, thus providing a balanced electromagnetic actuating mechanism.

In Fig. 3a the armature 30e is shown in the unexcited or neutral position, while in Fig. 3b it is shown in one limiting actuating position corresponding to maximum excitation of the windings 30c and 30d of one polarity. An extension of armature 30e is connected to the stylus 24 which is loosely supported for reciprocation in a projection 30j of the casing 30. Surrounding the stylus 24 is a noninductive heater 56 connected to and supported by terminals 57. The casing of the mechanism 30 comprises a permanent magnet structure in which the side plates 30f and 30g are permanent magnet elements, while the end plates complete their magnetic circuit through the C-members 30a and 30b. The armature 30e is mounted on a tension shaft 30h rigidly supported from the casing. In Figs. 3a and 3b the dotted lines indicate the paths of the permanent magnet flux in the two positions of the armature member, while the dash lines represent the paths of flux due to the actuating windings 30b and 30c.

The actual physical construction of one embodiment of the apparatus represented in Figs. 1 and 2 is shown in Figs. 4a and 4b in which corresponding elements are identified by the same reference characters. Briefly, the whole apparatus is mounted on a base or bed plate 50, the gearing 18, 19 and 46–49, the pulley 25, the flywheel 21, and the screen generator 40 being enclosed within an end housing 51. The actuating mechanism 30 is enclosed within a housing 52 mounted on carriage 23, while the electro-optical pick-up system is disposed within a housing 53 mounted on carriage 22. The pin clutch 15 is disposed within a central bearing support 54 which includes the pin clutch 15 and its operating lever 15d. The unit 54 also includes electrical switches and control members for the electrical system of the machine described hereinafter. The pulley 26 and the bearing for the right-hand end of the shaft 14b are disposed in an end housing 55. It will be understood, however, that the details of this mechanical construction and arrangement may be varied within wide limits to suit individual special requirements.

Referring specifically to Fig. 2 of the drawings, there is shown associated with the cylinder 10 and plate 11 a stroboscopic viewer for inspecting a plate while it is undergoing deformation. This viewer includes a portable microscope 60 disposed on a support 61 adjustably pivoted at 62 on a base 63 and thus adjustable for focusing on a plate 11. The microscope 60 is included within an enclosing housing 64 which also includes a stroboscopic light source, such as a gaseous lamp 65 and an optical system 66 for focusing the light upon an elemental area of the plate 11 being examined. The lamp 65 is connected to a circuit for exciting it from the periodic source or screen generator 40, as described hereinafter.

Referring now to Fig. 5 of the drawings, there is represented a circuit diagram, partially schematic, of the electrical system of the apparatus of Fig. 1, corresponding elements being identified by the same reference characters. Starting with the pick-up photocell 22c, this is represented as a device of the conventional electron multiplier type, in which the several multiplier cathodes 22g are connected to electrically spaced points on a voltage-divider resistor 70 connected between ground and the negative terminal of a unidirectional source −B. The anode of the cell 22c is connected to a suitable source +B through a load resistor 71, the signal across which is applied by way of a coupling condenser 72 to the input terminals of a photocell amplifier 73, which may be of any suitable well-known type.

The output terminals of the amplifier 73 are connected to supply the amplified signal across a load resistor 74. A low-pass inverse-feed-back network 75, constituted for example by a series resistor 75a followed by a shunt condenser 75b, is connected from the output terminals of the amplifier 73 through a coupling condenser 76 to the input terminals thereof for eliminating the effect on the output signal of variations of the mean brightness of an image sheet on the mean position of the stylus 24. As well understood in the art, such an inverse or negative feed-back of the low frequencies reduces the gain of the amplifier at such frequency to a very small value without appreciably affecting its response to the high-frequency components of the signal generated by the photocell 22c.

The periodic source of generator 40 is connected to modulate the output signal of the pick-up system developed across the load resistor 74. To this end, the generator 40 is connected as a variable condenser in the input circuit of a screen amplifier unit 77; specifically, the rotor is connected to ground while the stator is connected to a source of polarizing voltage +B through an isolating resistor 76a. The output of amplifier 77 is coupled through a condenser 78 to an additional amplifier unit 79, the output of the amplifier 79 being connected through a coupling condenser 80 to a load resistor 81 provided with an adjustable tap or connection 82. The signal at the tap 82 is applied to a scanner light amplifier 84, which is a power amplifier for generating a periodic current synchronous with the periodic potential developed by the generator 40. The current output of the amplifier 84 is connected to modulate the light source 22a of the pick-up system; specifically, the lamp 22a may be connected directly in the output circuit of the amplifier 84 to be excited thereby.

A second load resistor 85 is included in the output circuit of amplifier 79 and provided with an adjustable tap 86 from which a selected portion of the output signal is applied to a strobolight amplifier 87, which is also a power amplifier for developing a periodic current pulse synchronous with the periodic potential generated by generator 40. The gaseous discharge lamp 65 of the stroboscopic viewer is connected directly in the output of the amplifier 87.

In order to permit a ready adjustment of the maximum and minimum penetrations of a plate 11 being deformed by the stylus 24 in accordance with the maximum and minimum shade values of the image being reproduced, there is provided a circuit for combining an adjustable portion of the output of the screen generator 40 with an adjustable portion of the output from the photocell 22c to energize the actuating mechanism 30. To this end, the output of the amplifier 77 is applied also through a coupling condenser 88 to a load resistor 89 having an adjustable tap 90. The load resistor 74 of the amplifier 73 has an adjustable tap 91 and the taps 90 and 91 are interconnected through isolating resistors 92 and 93 and a switch 105, the junction of resistors 92 and 93 being connected to an isolating amplifier 94 which, in turn, is connected to a power amplifier 95, the output of which is connected through a power transformer 96 to the serially connected windings 30c and 30d of the stylus actuating mechanism 30. In case it should be desired to operate the machine of the invention from a separate synchronized source of image signals from a local or remote source, there may be provided a voltage divider 103 having an adjustable tap 104 and connected to the source or supply terminal 106 at which such signals appear. The switch 105 may then be operated selectively to connect with the tap 104 or the tap 91.

In series with the windings 30c, 30d is a dropping resistor 97 having an adjustable tap 98, while across the secondary winding of transformer 96 is connected a voltage-divider resistor 99 having an adjustable tap 100. The taps 98 and 100 are interconnected through isolating resistors 101 and 102, the junction of which is connected back to the input circuit of the power amplifier 95. From the tap 100 is derived a signal potential which varies with, and is a fraction of, the potential across the actuating windings 30c, 30d, while from the tap 98 is derived a potential varying with the signal current through the windings. These two signals are combined and fed back to the input circuit of amplifier 95 as an inverse feedback for linearizing the overall characteristics of the amplifier 95 and actuating mechanism 30 and for effectively controlling the output impedance of amplifier 95 to obtain a desired degree of damping of the actuating mechanism 30. The unidirectional sources for the several amplifier units of the circuit of Fig. 5 are represented collectively as +B, although the sources of the several amplifiers may be of different potential values according to the tube types and circuit constants of each amplifier. It will be understood that each of the several amplifiers described may be of any suitable conventional type of one or more stages, as required.

The general electrical power circuit for the system is represented at the top of Fig. 5. Power for the unit as a whole may be conventional 60-cycle, 110-volt power applied to the input terminals 110. The lower terminal 110 is connected to a bus 111 common to the power and control mechanisms hereinafter described. The upper terminal 110 is connected to a control line 112 through a manually operable off-on switch 113; a pair of limit switches 114 and 115 disposed in the path of travel of carriages 22 and 23 (not shown) for interrupting the electrical circuit in case either carriage reaches its limit of travel; the normally open contacts 116 of a safety microswitch mounted on the platform 34 and adapted to be closed initially by manual operation of the tool-actuating assembly 30 to operative position to complete a holding circuit for electromagnet 37; normally closed contacts of a push button stop switch 118; and the normally closed contacts 119 of a relay 120. The relay 120 is connected in the anode circuit of a vacuum-tube amplifier 121, the control electrode of which is connected to the output circuit of amplifier 79 and includes a conventional grid leak 122 and grid condenser 123. The relay 120 and amplifier 121 are adjusted so that the relay 120 maintains its contacts closed whenever normal potential is supplied from the screen generator 40 through the amplifiers 77 and 79. Thus, the elements 120, 121 constitute means responsive to the failure of the source, specifically, to the failure of rotation of the generator 40, for interrupting the control circuit 112, which de-energizes holding magnet 37, permitting the biasing spring 36 to actuate the tool 24 to inoperative position.

The contacts 119 of relay 120 complete a circuit to the holding magnet 37 of the actuating mechanism 30 through a resistor 124 and a rectifying device such as a contact rectifier 125, the winding 37 being by-passed by a condenser 126. Connected between the buses 111 and 112, immediately following the off-on switch 113, is a current transformer 127, the primary winding of which is connected in series with a constant-current ballast tube 128. The secondary winding of transformer 127 is connected directly to the heater 56. Following the contacts 116 of the safety switch, the motor 16 is connected between the buses 111 and 112. While the motor 16 may be of any suitable type, it is shown as a split-phase condenser motor of the hysteresis synchronous type, having one winding 16a connected directly between the power buses and a second winding 16b connected therebetween through a phase-splitting condenser 129. At this same point, a power rectifier unit 130 is connected between the buses 111 and 112. The unit 130 may be of any conventional type for converting the alternating-current supply to a unidirectional current of required operating potentials, indicated collectively by the reference +B.

Coming now to the operation of the apparatus described and referring first to the mechanical operation of the apparatus of Fig. 1, it will be seen that initially a plate to be engraved or deformed is mounted on cylinder 10 in any convenient manner, as by the method described in applicant's aforesaid copending application, Serial No. 40,595. The pin clutch 15 is disengaged and the image sheet is then mounted on cylinder 12 in any suitable manner. For this purpose, the carriage 22 may be unclamped from the belt 27 by means of the release knob 29. The carriage 22 may then be adjusted longitudinally to obtain proper registration of the pick-up system 22a—22c with the image sheet. The pin clutch 15 is then engaged to ensure a direct driving connection between the shaft portions 14a and 14b and further to ensure correct phasing of the cylinders 10 and 12.

The cylinders 10 and 12 may be manually rotated by virtue of the slip clutch 20 and the mechanism may be operated until the stylus 24 registers with a margin of the plate to be engraved. The stroboscopic viewer shown in Fig. 2 is then disposed to obtain a microscopic view of the elemental area of the plate 11 in registry with the stylus 24 and, with the electro-optical system in operation as described hereinafter, the deforming or decomposing of the plate 11 by the stylus 24 is observed when the electro-optical pick-up system views the darkest and lightest portions of the image sheet to be reproduced. Adjustments of the electrical system are then made, as described hereinafter, to obtain the appropriate minimum and maximum penetrations of the plate 11 by the stylus 24 corresponding to the darkest and lightest shade values present in the image sheet, respectively.

The cylinders 10 and 12 and their associated mechanism are then operated manually to place the electro-optical pick-up system at the starting corner of the image to be reproduced. The electrical system is then put in operation and is effective automatically to cause the electro-optical pick-up system to scan the image sheet in a spiral path and simultaneously to cause the stylus 24 to scan the plate 11. When the cylinders 10 and 12 are effectively on a common shaft, so that they rotate isochronously in the same direction, the carriages 22 and 23 move at equal speeds in opposite directions, due to the fact that they are clamped to opposite runs of the tape 27, as described above, the result is that the image reproduced on the plate 11 is laterally inverted with respect to the image sheet, so that when it is turned over it will reproduce the image in its correct relation.

Rotating simultaneously with the cylinders 10 and 12 and at the same speed is the rotor element 40a of the screen generator 40. This generator, as described hereinafter, is effective to modulate the light source 22a of the electro-optical system and the constants of the system are selected so as to procure substantially complete modulation, that is, so that the light source 22a is substantially completely extinguished at the frequency of the screen generator. The output of the photocell 22c is thus likewise modulated and, after amplification and the suppression of the unidirectional component, is applied as a signal-modulated carrier wave to the windings 30c and 30d of the actuating mechanism 30. This excitation of the windings 30c and 30d causes the stylus to oscillate about its mean or neutral position at the frequency of the signal developed by the screen generator 40, while the amplitude of the oscillation is varied or modulated in accordance with the amplitude of the signal developed by the photocell 22c which, in turn, varies with the shade values in the successive incremental areas of the image sheet being scanned. As stated above, the plate 11 is preferably of a decomposable material, such as cellulose nitrate, while the stylus 24 is heated to a temperature of the order of 1200° F. by the heater 56 so that, as it oscillates into contact with the plate 11, the stylus removes portions of the plate by thermal decomposition, forming pits of depth and surface area varying with the amplitude of the oscillation of the stylus 24 and thus with the variations in the shade value of the image sheet. As a result, there is formed on the surface of the plate 11 the equivalent of a half-tone structure comprising a series of elemental dots separating a series of pits formed by the oscillating stylus 24.

For proper image reproduction, the screen structure of the plate 11 should, for the lightest shade presented in the image being reproduced, contain a complete series of dots or islands separating the pits but of minimum area. Conversely, when scanning the darkest portion of the image sheet, a complete series of pits of minimum surface area should be formed. In order to secure this result, certain adjustments of the electrical system are made, as described hereinafter, to ensure that the amplitude of the pulsating excitation from the screen generator 40 is so proportioned to the constants of the actuating means 30 that the following relationships are satisfied:

(1) The mean penetration of the plate 11 by the tool 24 is of the same order of magnitude as the neutral separation of the tool and the plate.

(2) The amplitude of the pulsating excitation from the screen generator 40 is so proportioned to the response of the electro-optical pick-up system that the minimum penetration of the tool, corresponding to one shade extreme in the image, for example, black, is of the order of ⅕ of its maximum penetration, corresponding to the other shade value, for example, white.

(3) The rotational speed of the cylinders 10 and 12 is so related to the frequency of excitation from the screen generator 40 that the peripheral travel of the plate cylinder 10 during one period of the screen-frequency excitation is approximately twice the line spacing. For example, if it is desired to produce a 120-line halftone plate, the cylinder 10 should travel $1/60\sqrt{2}$ inch during one period or cycle of the screen frequency.

The foregoing relationships are represented in Fig. 1a, in which the line b represents the development of the surface of plate 11, while the line a represents the relative path of travel of the neutral position of the tool 24. In this figure, curve c represents one cycle of screen frequency modulated to minimum amplitude corresponding to a black shade in the image being scanned, while curve d represents another cycle of the screen frequency modulated at maximum amplitude corresponding to a white portion of the picture being scanned. The relative dimensions of the various parameters of one machine embodying the invention are presented in Fig. 1a and it will be seen that these relative dimensions satisfy the first two of the foregoing relations; that is, the excursion of curve c below the line b, representing the minimum penetration of the stylus, is approximately one-fifth the excursion of curve d below line b, representing the maximum penetration of the stylus, while the mean value of these two excursions is of the same order of magnitude as the separation of the lines a and b representing the neutral separation of the stylus and the plate. It will also be seen that, since the unidirectional component of the modulated signal is suppressed so that only a pure alternating current signal is applied to the windings of the actuating mechanism 30, only the negative half of each cycle of screen frequency is effective to actuate the tool 24 into penetration of the plate 11. Therefore, the surface of plate 11 on cylinder 10 must travel a distance equal to the spacing of adjacent lines in the period from the commencement of one negative half cycle effective to form a pit of one line to the successive negative half cycle effective to form the next pit. This satisfies the third relationship above.

Turning now to Fig. 5 of the drawings, there will be taken up the operation of the electrical system of the machine of Fig. 1. In order to place the machine in operation, the on-off switch 113 is initially closed. This energizes the heater 56 through the current transformer 127 and the heaters of the various electron tubes. With the limit switches 114, 115 normally closed and after a reasonable warm-up time, the tool actuating assembly 30 is manually lowered to operative position, contacts 116 are closed, and the motor 16 is placed in operation to drive the various mechanical elements of the machine of Fig. 1, including the screen generator 40. Simultaneously, the power rectifier 130 is energized and supplies at its output terminals +B suitable unidirectional potentials for the several amplifiers of the system. When the apparatus has reached normal speed and the power rectifier is in operation, the screen generator 40 is effective to develop a periodic potential of the desired frequency which is amplified in the units 77 and 79 and applied to the grid of amplifier tube 121. Initially tube 121 has zero bias and is fully conductive, energizing relay 120 to hold open its normally closed contacts. However, when the screen-frequency signal is applied to the grid of tube 121, it is self-biased by grid rectification substantially to cut-off de-energizing relay 120 to close its contacts 119. Up to this time, the platform 34 must be held down manually. Upon the closing of contacts 116 and 119, however, the electromagnet 37 is energized with unidirectional current through the rectifier 125. The electromagnet then attracts its armature 34 to hold the actuating mechanism into engagement with the plate 11 on cylinder 10. The machine is now in full operation for forming an image on the plate 11.

As stated above, initially the tool 24 is operated to a margin of the plate 11 for forming a test pattern on such margin, while observed by the stroboscopic viewer, as shown in Fig. 2. The neutral position of the tool 24 is adjusted by adjusting the shoe 32 by the knob 33 (Fig. 2) to the desired relation, as represented in Fig. 1a. In view of the fact that the output of the screen generator 40 as amplified in units 77, 79, and 87 is applied to the gaseous discharge lamp 65 of the stroboscopic viewer, this lamp illuminates in synchronism with the lamp 22a of the electro-optical pick-up system, so that the elemental portion of the plate 11 being viewed is illuminated only for brief intervals synchronous with the peaks of the modulated screen frequency, this is, with the points of maximum penetration of the tool 24. As is well understood in the art, the observer thus obtains an apparently stationary view of the minute portion of the plate penetrated by the tool 24.

Initially the minimum penetration or deformation of the plate is adjusted to correspond to the black level or darkest shade in the image sheet being scanned. This initial adjustment is made by tap 90 of voltage divider 89 which adjusts the minimum amplitude of the screen-frequency signal amplified and applied to the actuating mechanism 30. This adjustment may be made substantially independently of the signal from the electro-optical pick-up system, since that signal for black shade levels is an inappreciable fraction of the amplitude of the signal from the screen generator 40.

The pick-up system is then adjusted to a portion of the image of maximum brightness, for example, white, and the tap 91 of the voltage divider 74 in the output of the amplifier 73 is then adjusted to obtain the desired maximum penetration in accordance with the relationships of Fig. 1a. The operation of the system with the switch 105 connected to the external source of image signals 106 is in all respects the same, it only being necessary that such signals be derived from a pick-up system, either local or remote, operating synchronously with the pick-up carriage 22 of Fig. 1.

By way of example only, there may be given the following specifications of one machine constructed in accordance with the invention and providing satisfactory operation:

| | |
|---|---|
| Screen | 65 lines per inch. |
| Screen frequency | 350 cycles per second. |
| Speed of cylinders **10, 12** | 50 R. P. M. |
| Lead | $1/65\sqrt{2}$. |
| Mesh | $65\sqrt{2}$. |
| Stylus **24** | Radial to cylinder. |
| Stylus taper angle | 75°. |

Thus, there is provided by the invention a machine for producing on a plate a screened relief pattern from an image sheet which virtually eliminates all skill or technique previously required to produce half-tone engravings. Furthermore, the machine of the invention produces such plates in only a small fraction of the time required for conventional photo-engravings. For example, it has been found possible to produce a plate 8 x 10″ of 65 screen in eighteen minutes. The machine is capable of extreme accuracy of reproduction of intermediate shade values between full black and full white. At the same time, all chemicals and necessary facilities for handling them are eliminated. By the use of the stroboscopic viewer as described, it is possible to determine in advance the desired contrast range of the resultant plate. This is in marked contrast to the conventional chemical processes which generally require repeated trials before the desired contrast range is obtained. Further, by the simple operation of switch 105 of Fig. 5, it is possible to adapt the machine of the invention to operation from image-representing signals received by radio or wire from remote synchronously scanned sources.

While there has been described what is at present considered to be the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A machine for producing on a plate from an image sheet a screened relief pattern suitable for image reproduction by printing processes comprising: a first cylinder for supporting a plate; a second cylinder for supporting an image sheet; means for rotating said cylinders synchronously; a first reciprocable carriage including an electro-optical pick-up system disposed for scanning an image sheet on said second cylinder; a second reciprocable carriage including a plate-deforming tool disposed for scanning a plate on said first cylinder; means responsive to the output of said pick-up system for actuating said tool; means for reciprocating said carriages synchronously; an electrical screen generator including a rotor element driven synchronously with said cylinders and an independently rotatable stator; and means for rotating said stator at a speed of a lower order of magnitude than said rotor element; the output of said generator being connected to modulate the output of said pick-up system.

2. A machine for producing on a plate from an image sheet a screened relief pattern suitable for image reproduction by printing processes comprising: a first cylinder for supporting a plate; a second cylinder for supporting an image sheet; means for rotating said cylinders; a first reciprocable carriage including an electro-optical pick-up system disposed for scanning an image sheet on said second cylinder; a second reciprocable carriage including a plate-deforming tool disposed for scanning a plate on said first cylinder; means responsive to the output of said pick-up system for actuating said tool; means for reciprocating said carriages synchronously; an electrical screen generator including a rotor element driven synchronously with said cylinders and an independently rotatable stator; and means for rotating said stator at a fraction of the speed of said cylinders equal to one-half the ratio of the speed of said cylinders to the screen frequency; the output of said generator being connected to modulate the output of said pick-up system.

3. A machine for producing on a plate from an image sheet a screened relief pattern suitable for image reproduction by printing processes comprising: a first cylinder for supporting a plate; a second cylinder for supporting an image sheet; means for rotating said cylinders isochronously; a first reciprocable carriage including an electro-optical pick-up system disposed for scanning an image sheet on said second cylinder; a second reciprocable carriage including a plate-deforming tool disposed for scanning a plate on said first cylinder; means responsive to the output of said pick-up system for actuating said tool; means for reciprocating said carriages isochronously; an electrical screen generator including a rotor element driven directly by said shaft and a rotatable stator element; and a speed-reducing gear connected to drive said stator from said shaft; the output of said generator being connected to modulate the output of said pick-up system.

4. A machine for producing on a plate from an image sheet a screened relief pattern suitable for image reproduction by printing processes comprising: a first [cylinder] *member* for supporting a plate; a second [cylinder] *member* for supporting an image sheet; means for [rotating said cylinder] *moving said members* synchronously; a first reciprocable carriage including an electro-optical pick-up system disposed for scanning an image sheet on said second [cylinder] *member*; a second reciprocable carriage including a plate-deforming tool disposed for scanning a plate on said first [cylinder] *member*; means responsive to the output of said pick-up system for actuating said tool; means for reciprocating said carriages synchronously; said pick-up system including a light source; and a source of pulsating current of screen frequency connected to modulate said light source synchronously with the scanning of the image sheet.

5. A machine for producing on a plate from an image sheet a screened relief pattern suitable for image reproduction by printing processes comprising: a first [cylinder] *member* for supporting a plate; a second [cylinder] *member* for supporting an image sheet; means for [rotating said cylinders] *moving said members* synchronously; a first reciprocable carriage including an electro-optical pick-up system disposed for scanning an image sheet on said second [cylinder] *member*; a second reciprocable carriage including a plate-deforming tool disposed for scanning a plate on said first [cylinder] *member*; means responsive to the output of said pick-up system for actuating said tool; means for reciprocating said carriages synchronously; said pick-up system including a gaseous electrical discharge lamp; and a source of pulsating current of screen frequency connected to modulate the excitation of said lamp synchronously with the scanning of the image sheet.

6. A machine for producing on a plate from an image sheet a screened relief pattern suitable for image reproduction by printing processes comprising: a first [cylinder] *member* for supporting a plate; a second [cylinder] *member* for supporting an image sheet; means for [rotating said cylinders] *moving said members* synchronously; a first reciprocable carriage including an electro-optical pick-up system disposed for scanning an image sheet on said second [cylinder] *member*; a second reciprocable carriage including a plate-deforming tool disposed for scanning a plate on said first [cylinder] *member*; means responsive to the output of said pick-up system for actuating said tool; means for reciprocating said carriages synchronously; said pick-up system including a light source; a periodic potential generator of screen frequency; and a power amplifier for generating a periodic current synchronous with said periodic potential and connected to modulate said light source synchronously with the scanning of the image sheet.

7. A machine for producing on a plate from an image sheet a screened relief pattern suitable for image reproduction by printing processes comprising: a first [cylinder] *member* for supporting a plate; a second [cylinder] *member* for supporting an image sheet; means for [rotating said cylinders] *moving said members* synchronously; a first reciprocable carriage including an electro-optical pick-up system disposed for scanning an image sheet on said second [cylinder] *member*; a second reciprocable carriage including a plate-deforming tool disposed for scanning a plate on said first [cylinder] *member*; means responsive to the output of said pick-up system for actuating said tool; means for reciprocating said carriages synchronously; said pick-up system including a gaseous electrical discharge lamp; a periodic potential generator of screen frequency; and a power amplifier for generating a periodic current synchronous with said periodic potential and connected to excite said lamp synchronously with the scanning of the image sheet.

8. In a machine for producing on a plate from an image sheet a relief pattern suitable for image reproduction by printing processes and including a pair of synchronously [rotatable cylinders] *movable members* for individually supporting a plate and an image sheet and a pair of reciprocable carriages individually including a pick-up system and a plate-deforming tool for respectively scanning said image-sheet [cylinder] *member* and said plate [cylinder] *member*, a mechanism for reciprocating said carriages synchronously in opposite directions to obtain an inverted relief pattern comprising: a pair of spaced pulleys; a tensioned inelastic belt supported on said pulleys; one of said carriages including means for locking it to one run of said belt and a releasable clamp on the other of said carriages disposed to engage the other run of said belt.

9. In a machine for producing on a plate from an image sheet a relief pattern suitable for image reproduction by printing processes and including a pair of synchronously [rotatable cylinders] *movable members* for individually supporting a plate and an image sheet and a pair of reciprocable carriages individually including a pick-up system and a plate-deforming tool for respectively scanning said image-sheet [cylinder] *member* and said plate [cylinder] *member*, a mechanism for reciprocating said carriages synchronously in opposite directions to obtain an inverted relief pattern comprising: a pair of spaced pulleys; a tensioned steel tape supported on said pulleys; one of said carriages including means for locking it to one run of said tape and a releasable clamp on the other of said carriages disposed to engage the other run of said tape.

10. In a machine for producing on a plate from an image sheet a relief pattern suitable for image reproduction by printing processes and including a pair of [rotatable cylinders] *synchronously movable members* for individually supporting a plate and an image sheet and a pair of reciprocable carriages individually including a pick-up system and a plate-deforming tool for respectively scanning said image-sheet [cylinder] *member* and said plate [cylinder] *member*, a common drive [shaft] *element* for said [cylinders] *members* including a disengageable coupling; a mechanism for reciprocating said carriages synchronously in opposite directions to obtain an inverted relief pattern comprising: a pair of spaced pulleys; a tensioned inelastic belt supported in said pulleys; one of said carriages including means for locking it to one run of said belt and a clamp on the other of said carriages disposed to engage the other run of said belt and releasable to permit independent adjustment of said other carriage upon disengagement of said coupling.

11. In a machine for producing on a plate from an image sheet a relief pattern suitable for image reproduction by printing processes and including a pair of [synchronously rotatable cylinders] *synchronously movable members* for individually supporting a plate and an image sheet and a pair of reciprocable carriages individually including a pick-up system and a plate-deforming tool for respectively scanning said image-sheet [cylinder] *member* and said plate [cylinder] *member*, a positioning and actuating mechanism for said plate-deforming tool comprising: a tool actuating assembly including a plate-deforming tool; means for determining the neutral position of said tool assembly; electromagnetic means connected to respond to the output of said pick-up system for actuating said tool; and means for producing a pulsating excitation of said actuating means at a screen frequency; the amplitude of said pulsating excitation being so proportioned to the constants of said actuating means that the mean penetration of a plate by said tool is of the same order of magnitude as the neutral separation of said tool and its plate.

12. In a machine for producing on a plate from an image sheet a relief pattern suitable for image reproduction by printing processes and including a pair of [synchronously rotatable cylinders] *synchronously movable members* for individually supporting a plate and an image sheet and a pair of reciprocable carriages individually including a pick-up system and a plate-deforming tool for respectively scanning said image-sheet [cylinder] *member* and said plate [cylinder] *member*, a positioning and actuating mechanism for said plate-deforming tool comprising: a tool actuating assembly including a plate-deforming tool; means for determining the neutral position of said tool assembly; electromagnetic means connected to respond to the output of said pick-up system for actuating said tool; and means for producing a pulsating excitation of said actuating means at a screen frequency; the amplitude of said pulsating excitation being so proportioned to the response of the pick-up system that the minimum penetration of said tool corresponding to one shade extreme in said image is of the order of one-fifth its maximum penetration corresponding to the other shade extreme.

13. In a machine for producing on a plate from an image sheet a relief pattern suitable for image reproduction by printing processes and including a pair of [synchronously rotatable cylinders] *synchronously movable members* for individually supporting a plate and an image sheet and a pair of reciprocable carriages individually including a pick-up system and a plate-deforming tool for respectively scanning said image-sheet [cylinder] *member* and said plate [cylinder] *member*, a positioning and actuating mechanism for said plate-deforming tool comprising: a tool actuating assembly including a plate-deforming tool; means for determining the neutral position of said tool assembly; electromagnetic means connected to respond to the output of said pick-up system for actuating said tool; and means for producing a pulsating excitation of said actuating means at a screen frequency; the speed of said [cylinders] *members* being so related to the frequency of said excitation that the [peripheral] travel of said [cylinders] *members* during one period of said excitation is approximately twice the desired line spacing.

14. In a machine for producing on a plate from an image sheet a relief pattern suitable for image reproduction by printing processes and including a pair of [synchronously rotatable cylinders] *synchronously movable members* for individually supporting a plate and an image sheet and a pair of reciprocable carriages individually including a pick-up system and a plate-deforming tool for respectively scanning said plate [cylinder] *member* and said image-sheet [cylinder] *member*, a positioning and actuating mechanism for said plate-deforming tool comprising: a tool actuating assembly including a plate-deforming tool; means for biasing said tool assembly into engagement with said plate cylinder; said tool assembly including an adjustable shoe engaging a plate on said plate [cylinder] *member* for determining the neutral position of said tool; electromagnetic means connected to respond to the output of said pick-up system for actuating said tool; and means for producing a pulsating excitation of said actuating means at a screen frequency.

15. A machine for producing on a plate from an image sheet a screened relief pattern suitable for image reproduction by printing processes comprising: a plate and image-sheet supports; means including an electro-optical pick-up system for scanning an image sheet on its support; means including a plate-deforming tool for scanning a plate on its support synchronously with said first scanning means; means responsive to the output of said pick-up system for actuating said tool; a periodic electrical screen generator connected to modulate the output of said pick-up system; and means for adjusting the output of said generator to adjust the minimum deformation of said plate corresponding to the black level of an image sheet.

16. A machine for producing on a plate from an image sheet a screened relief pattern suitable for image reproduction by printing processes comprising: plate and image-sheet supports; means including an electro-optical pick-up system including a light source for scanning an image sheet on its support; means including a plate-deforming tool for scanning a plate on its support synchronously with said first scanning means; means responsive to the output of said pick-up system for actuating said tool; a periodic electrical screen generator connected to modulate said light source; and means for applying an adjustable portion of the output of said generator to said tool actuating means to adjust the minimum deformation of said plate corresponding to the black level of an image sheet.

17. A machine for producing on a plate from an image sheet a screened relief pattern suitable for image reproduction by printing processes comprising: plate and image-sheet supports; means including an electro-optical pick-up system including a light source for scanning an image sheet on its support; means including a plate-deforming tool for scanning a plate on its support synchronously with said first scanning means; a first amplifier coupled to the output of said pick-up system; a periodic electrical screen generator; a second amplifier coupled to said generator; and means responsive jointly to the outputs of said amplifiers for actuating said tool.

18. A machine for producing on a plate from an image sheet a screened relief pattern suitable for image reproduction by printing processes comprising: plate and image-sheet supports; means including an electro-optical pick-up system including a light source for scanning an image sheet on its support; means including a plate-deforming tool for scanning a plate on its support synchronously with said first scanning means; a first amplifier coupled to the output of said pick-up system; a periodic electrical screen generator; a second amplifier coupled to said generator; means for combining adjustable portions of the outputs of said amplifiers; and means responsive to said combined outputs for actuating said tool.

19. A machine for producing on a plate from an image sheet a screened relief pattern suitable for image reproduction by printing processes comprising: plate and image-sheet supports; means including an electro-optical pick-up system for scanning an image sheet on its support; means including a plate-deforming tool for scanning a plate on its support synchronously with said first scanning means; means responsive to the output of said pick-up system for actuating said tool; a periodic electrical screen generator connected to modulate the output of said pick-up system; and means for adjusting the output of said pick-up system to adjust the maximum deformation of said plate corresponding to the white level of an image sheet.

20. A machine for producing on a plate from an image sheet a screened relief pattern suitable for image reproduction by printing processes comprising: plate and image-sheet supports; means including an electro-optical pick-up system for scanning an image sheet on its support; means including a plate-deforming tool for scanning a plate on its support synchronously with said first scanning means; means responsive to the output of said pick-up system for actuating said tool, a periodic electrical screen generator connected to modulate the output of said pick-up system; means for adjusting the output of said generator to adjust the minimum deformation of said plate corresponding to the black level of an image sheet; and means for adjusting the output of said pick-up system substantially independently to adjust the maximum deformation of said plate corresponding to the white level of an image sheet.

21. A machine for producing on a plate from an image sheet a screened relief pattern suitable for image reproduction by printing processes comprising: plate and image-sheet supports; means including an electro-optical pick-up system including a light source for scanning an image sheet on its support; means including a plate-deforming tool for scanning a plate on its support synchronously with said first scanning means; a first amplifier coupled to the output of said pick-up system; a periodic electrical screen generator; a second amplifier coupled to said generator; means for combining the outputs of said amplifiers; means responsive to said combined outputs for actuating said tool; means for adjusting the output of said generator amplifier to adjust the minimum deformation of said plate corresponding to the black level of an image sheet; and means for adjusting the output of said pick-up system amplifier to adjust the maximum deformation of said plate corresponding to the white level of an image sheet.

22. A machine for producing on a plate from an image sheet a screened relief pattern suitable for image reproduction by printing processes comprising: plate and image-sheet supports; means including an electro-optical pick-up system for scanning an image sheet on its support; means including a plate-deforming tool for scanning a plate on its support synchronously with said first scanning means; means responsive to the output of said pick-up system for actuating said tool; a source of periodic potential connected to modulate the output of said pick-up system; and means responsive to the failure of said source for actuating said tool to an inoperative position.

23. A machine for producing on a plate from an image sheet a screened relief pattern suitable for image reproduction by printing processes comprising: plate and image-sheet supports; means including an electro-optical pick-up system for scanning an image sheet on its support; means including a plate-deforming tool for scanning a plate on its support synchronously with said first scanning means; means for biasing said tool to an inoperative position; a normally excited electro-magnetic means for retaining said tool in an operative position; means responsive to the output of said pick-up system for actuating said tool; a source of periodic potential connected to modulate the output of said pick-up system; and means responsive to the failure of said source for de-energizing said electromagnetic means.

24. A machine for producing on a plate from an image sheet a screened relief pattern suitable for image reproduction by printing processes comprising: plate and image-sheet supports; means including an electro-optical pick-up system for scanning an image sheet on it support; means including a plate-deforming tool for scanning a plate on its support synchronously with said first scanning means; means including an amplifier responsive to the output of said pick-up system for actuating said tool; a filter network coupled to said amplifier for eliminating the effect of variations of the mean brightness of an image sheet on the mean position of said tool; and a source of periodic potential of screen frequency connected to modulate the output of said pick-up system.

25. A machine for producing on a plate from an image sheet a screened relief pattern suitable for image reproduction by printing processes comprising: plate and image-sheet supports; means including an electro-optical pick-up system for scanning an image sheet on its support; means including a plate-deforming tool for scanning a plate on its support synchronously with said first scanning means; means including an amplifier responsive to the output of said pick-up system for actuating said tool; a low-pass inverse feed-back network coupled to said amplifier for eliminating the effect of variations of the mean brightness of an image sheet on the mean position of said tool; and a source of periodic potential of screen frequency connected to modulate the output of said pick-up system.

26. A machine for producing on a plate from an image sheet a screened relief pattern suitable for image reproduction by printing processes comprising: plate and image-sheet supports; means including an electro-optical pick-up system for scanning an image sheet on its support; means including a plate-deforming tool for scanning a plate on its support synchronously with said first scanning means; means responsive to the output of said pick-up system for actuating said tool; a source of periodic potential of screen frequency connected to modulate the output of said pick-up system; and a stroboscopic viewer for said plate including a light source energized from said source.

27. A machine for producing on a plate from an image sheet a screened relief pattern suitable for image reproduction by printing processes comprising: plate and image-sheet supports; means including an electro-optical pick-up system for scanning an image sheet on its support; means including a plate-deforming tool for scanning a plate on its support synchronously with said first scanning means; means responsive to the output of said pick-up system for actuating said tool; a source of periodic potential of screen frequency connected to modulate the output of said pick-up system; a portable microscope adjustable for focusing on a plate undergoing deformation and including a stroboscopic light source; and a circuit for exciting said light source from said periodic source.

References Cited in the file of this patent or the original patent

UNITED STATES PATENTS

| Number | Name | Date |
|---|---|---|
| 2,063,614 | McFarlane | Dec. 8, 1936 |
| 2,079,970 | Speed | May 11, 1937 |
| 2,179,002 | Washington, Jr. | Nov. 7, 1939 |
| 2,489,691 | Washington | Nov. 29, 1949 |